(12) United States Patent
Wu et al.

(10) Patent No.: US 11,675,765 B2
(45) Date of Patent: Jun. 13, 2023

(54) TOP CONTRIBUTOR RECOMMENDATION FOR CLOUD ANALYTICS

(71) Applicant: BUSINESS OBJECTS SOFTWARE LTD., Dublin (IE)

(72) Inventors: Ying Wu, Dublin (IE); Malte Christian Kaufmann, Dublin (IE); Alan McShane, Raheny (GB); Anirban Banerjee, Kilcullen (IE); Gareth Maguire, Newbridge (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 0 days.

(21) Appl. No.: 17/329,519

(22) Filed: May 25, 2021

(65) Prior Publication Data

US 2022/0382729 A1 Dec. 1, 2022

(51) Int. Cl.
*G06F 16/22* (2019.01)
*G06F 18/2113* (2023.01)
*G06F 18/2321* (2023.01)
*G06F 18/23213* (2023.01)

(52) U.S. Cl.
CPC ...... *G06F 16/2237* (2019.01); *G06F 16/2264* (2019.01); *G06F 18/2113* (2023.01); *G06F 18/2321* (2023.01); *G06F 18/23213* (2023.01)

(58) Field of Classification Search
CPC ............ G06F 16/2237; G06F 16/2264; G06K 9/6223; G06K 9/6226; G06K 9/623
USPC ...................................................... 707/741
See application file for complete search history.

(56) References Cited

U.S. PATENT DOCUMENTS

| | | | |
|---|---|---|---|
| 8,311,973 B1 * | 11/2012 | Zadeh | G06T 7/12 706/903 |
| 8,805,858 B1 * | 8/2014 | Ray | G06F 16/29 707/754 |
| 10,162,842 B2 * | 12/2018 | Ross | G06F 16/2237 |
| 10,719,768 B1 * | 7/2020 | Segev | G06Q 30/0201 |
| 2008/0077570 A1 * | 3/2008 | Tang | G06F 16/951 707/999.005 |
| 2012/0095982 A1 * | 4/2012 | Lennington | G06V 20/00 707/E17.069 |
| 2012/0254192 A1 * | 10/2012 | Gelbard | G06F 16/2237 707/745 |
| 2014/0229464 A1 * | 8/2014 | Milenova | G06F 16/2453 707/718 |

(Continued)

*Primary Examiner* — Giovanna B Colan
(74) *Attorney, Agent, or Firm* — Buckley, Maschoff & Talwalkar LLC

(57) ABSTRACT

A system and method including determining, for a specified target measure column of a first dataset including a plurality of records, the metadata of the first dataset, including a probability distribution for the specified target column and dimension scores for the dimensions for the first dataset conditioned on the specified target measure column, where the first dataset comprises a plurality of columns including the at least one target measure column and a plurality of non-numeric, dimension columns for the records of the first dataset; determining, for a subset of data of the first dataset based on one or more specified variables, dimension scores for the dimensions of the subset of data approximately derived from the determined metadata of the first dataset; and providing recommendations of top contributors based on the approximated dimension scores of dimensions of the subset of data.

18 Claims, 9 Drawing Sheets

(56) References Cited

U.S. PATENT DOCUMENTS

2016/0350396 A1* 12/2016 Blanc ...................... G06F 16/27
2019/0377774 A1* 12/2019 Joshi ........................ G06N 7/01
2020/0184278 A1*  6/2020 Zadeh .................... G06N 3/044

* cited by examiner

| Company Name | Location | Product Type | Industry | Product_A Sales | Product_B Sales | Total Sales |
|---|---|---|---|---|---|---|
| | | | | | | |
| | | | | | | |
| | | | | | | |
| | | | | | | |
| | | | | | | |
| | | | | | | |
| | | | | | | |

DETERMINE METADATA OF A DATASET, INCLUDING A PROBABILITY
DISTRIBUTION FOR A SPECIFIED TARGET MEASURE COLUMN AND
RANKINGS FOR THE DIMENSIONS OF THE DATASET

405

DETERMINE, FOR A SUBSET OF THE DATASET, A PROBABILITY DISTRIBUTION FOR
A TARGET MEASURE AND THE DIMENSION SCORES OF THE SUBSET THAT
IS APPROXIMATELY DERIVED FROM THE METADATA OF THE DATASET

410

US 11,675,765 B2

TOP CONTRIBUTOR RECOMMENDATION FOR CLOUD ANALYTICS

BACKGROUND

An enterprise might provide data analytics software-as-a-service (SaaS) in a cloud environment with a platform of tools and different functionalities. Some of the functionalities might include, for example, data visualization, data analysis, and business planning. While data visualizations generated for a user (e.g., customer) may present the user's data in an organized manner, patterns in the data might not be readily apparent in the visualizations and complex relationships within the data might also be hidden in the visualizations.

In some aspects, it may be difficult to provide the data analytics in a cloud environment. For example, in order to provide analytics on the current state of the dataset for a customer, the analysis of the data may have to be performed repeatedly to ensure the generated visualizations actually reflect the current state of the data. The repeated analysis of the dataset, in response to the customer's different analysis requests, may require the repeated retrieval of data from the customer to the cloud. This continual retrieval of data to the cloud may raise data security concerns with the customer, including an increased the risk of exposing sensitive data in the cloud. Additionally, the need to repeatedly perform the data analytics to ensure the customer is presented with accurate, current results can raise potential performance issues as the data is retrieved to the cloud and processed by backend systems.

BRIEF DESCRIPTION OF THE DRAWINGS

FIG. 2 is an illustrative table representation of data according to some embodiments;

DETAILED DESCRIPTION

The following description is provided to enable any person in the art to make and use the described embodiments and sets forth the best mode contemplated for carrying out the described embodiments. Various modifications, however, will remain apparent to those in the art.

Figure 1:
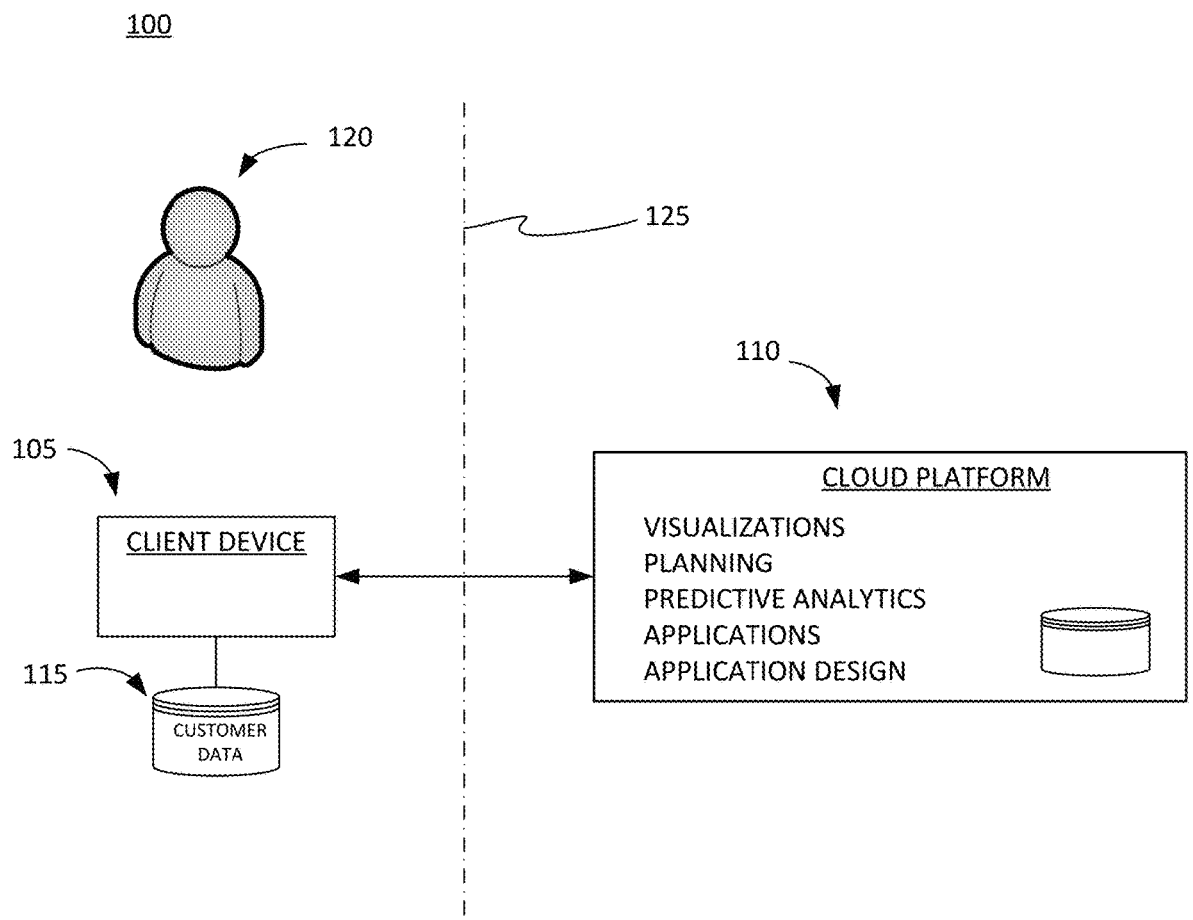
FIG. 1 is a block diagram of some illustrative aspects of a cloud platform according to some embodiments.

FIG. 1 is a block diagram 100 illustratively depicting some aspects of a cloud environment and customer data related thereto. In some aspects, the front end of system 100 generally includes client device 105 (e.g., thin client), a user interface accessed via the client device, and software (e.g., applications and/or browsers) running on the client device. The backend of system 100 may generally refer to hardware and software, such as applications, services, infrastructure, and storage that supports and facilitates the services and functionalities provided by cloud platform 110 to empower the frontend. The computing resources and capabilities of the backend of system 100 are typically far greater and robust (e.g., faster processors, more storage, greater data security, etc.) than that of the frontend. Both the frontend and backend of system 100 may include features and components in addition to those specifically discussed here and/or shown in FIG. 1, where FIG. 1 is simplified for purposes of clarity.

Data 115 belongs to customer 120 (e.g., a business enterprise) and may include running data related to the customer's business (e.g., healthcare, retail, digital media, financial services, etc.) operations, wherein storage of the data may be on-premises or otherwise controlled by the customer. Cloud platform 110 may support cloud applications and services such as, for example, business intelligence, visualizations, planning, predictive analytics, application design, etc. Storing and/or using the customer data on cloud platform 110, in response to customer requests for services and functionalities provide by the cloud platform, may involve the retrieval of customer data 115 to cloud platform 110. In some aspects, the retrieval of data to the cloud platform might potentially expose the data to one or more types of data security risks, notwithstanding firewall 125 and other data security protections (not shown in FIG. 1).

Some embodiments provide a framework to provide at least one top contributor recommendation to a user (e.g., customer) of a data analytics platform or service in a cloud environment for a set of data. The at least one top contributor recommendation might provide insight and/or add context to a visualization provided by the data analytics platform or service by identifying the at least one top contributor to a selected or specified value of the analyzed data. In some aspects, a top contributor herein refers to the dimension members that provide the highest contribution or influence to the specific data value being analyzed.

Figure 2:
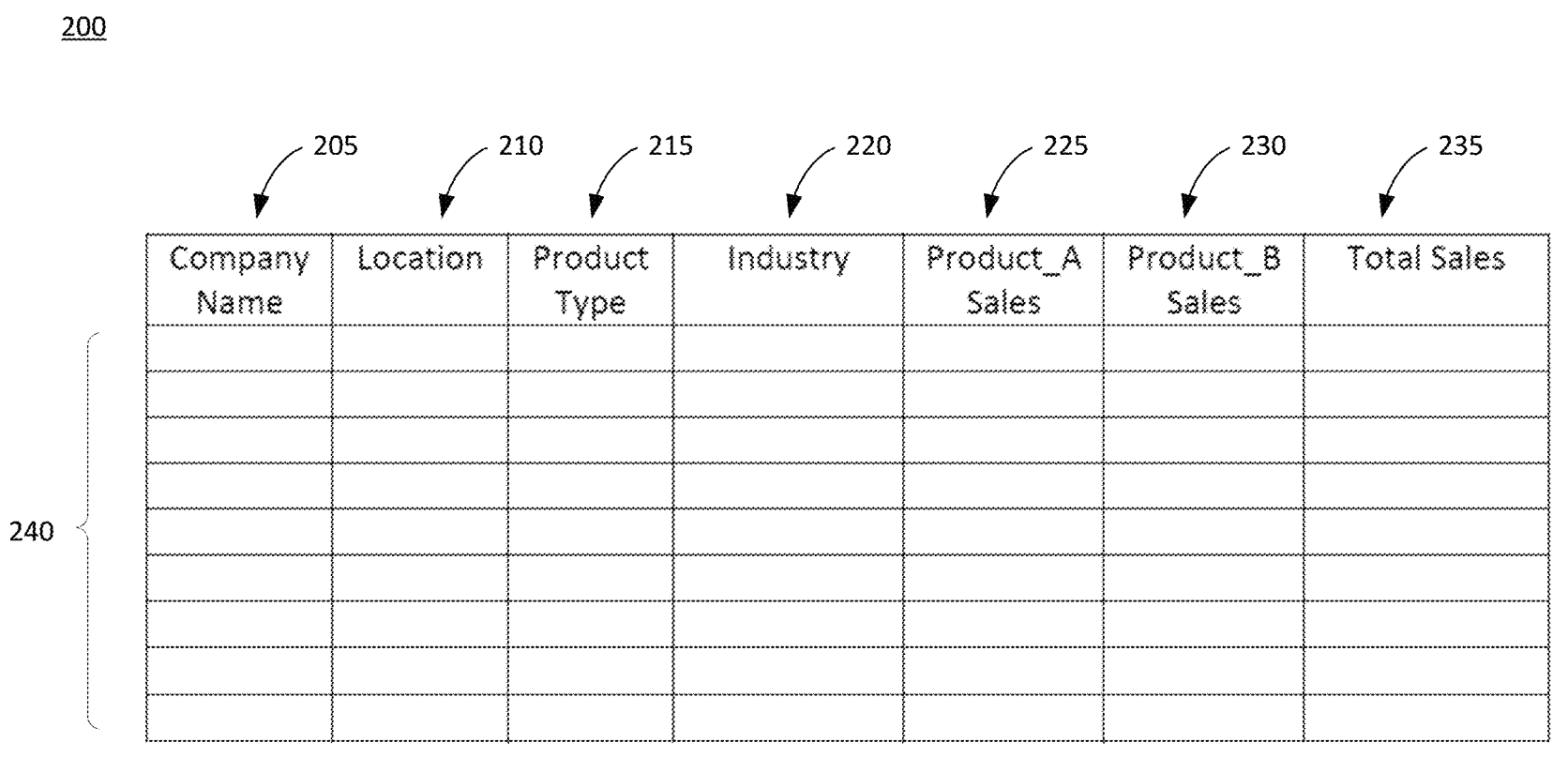

FIG. 2 is an illustrative table representation of data, according to some embodiments. The data might, in some instances, include customer data corresponding to one or more database tables that may be used in a cloud environment by one or more cloud applications and services supported by a cloud platform infrastructure. As shown, table 200 is representative of a dataset (e.g. a collection of database tables) in some embodiments, where each column of the table represents a particular variable and each of the rows 240 corresponds to a specific record of the dataset. In the example of FIG. 2, columns are shown at 205, 210, 215, 220, 225, 230, and 235 while the rows are shown at 240 (not labeled individually). Table 200 may include data values that are either a categorical, non-numeric type (e.g., string, character, Boolean) or a quantitative, numeric type (e.g., an integer, decimal, etc.) The columns in table 200 include either include non-numeric categorical values that are referred to herein as dimension columns or numeric values that are referred to herein as measures (e.g., columns 225, 230, and 235). As illustrated in the example of FIG. 2, dimension (i.e., non-numeric value) columns in table 200 may include a column for a company name 205, country location 210, product type 215, and an industry identifier (e.g., healthcare, technology, media, etc.) and the measure (numeric value) columns therein might include columns for revenue expended on a first product 225, revenue expended on a second product 230, and total revenue expended in a particular time period 235, where corresponding dimension values and measure values populate each column for each record 240.

According to some embodiments, a data analytics service or application might present, in response to a user's request for an analysis of their data, a chart including table 200 to the user via a user interface (UI) in a browser executing on the user's computing device (e.g., a computer tablet, mobile phone, laptop, etc.). The dataset analyzed may comprise hundreds or thousands (or more) records and numerous dimensions and measures. Table 200 is a simplified representative table example, limited in the number of rows and columns for purposes of discussion herein, and is not indicative of a limitation of any dataset(s) discussed or applicable herein. In some instances, the user might want to know which of the dimensions of the analyzed data contribute the most (i.e., the top contributor) to a specific target measure. That is, the user might desire to know the key factor(s) that contribute to a specified target measure. For example, a user may specify the measure "total sales" 235 as the target measure and want to know which of the dimensions (e.g., 205, 210, 215, and 220) contributes the most (e.g., the top-most, top 3, top 5, etc. that contribute the highest positively or negatively) to the specified "total sales" measure values. A system and method to determine and present the top contributors corresponding to a specified target measure might uncover important patterns in the data being analyzed to, for example, focus attention on the most impactful or influential contributors to the specified measure that might not be evident from the presentation of table 200 alone.

In some embodiments, for each available dimension within a data model, a selected or specified measure is evaluated to analyze which members (i.e., unique members) in the dimension have the highest contribution (i.e., highest absolute value) to the overall measure value. In some embodiments, the number of dimensions evaluated might be limited so as not to inundate the user with results and the results returned to the customer includes the top contributors deemed useful and/or informative to the customer. In one embodiment, an approach to determine the top contributor to a specified target measure includes examining a member within each dimension with the highest contribution determined by how much it deviates from the average value of all members in the dimension. In some embodiments, a formula $$\text{Deviance Score} = \frac{(MAX - AVG)}{AVG}$$

may be used to determine a deviance score for each dimension. In the above formula, MAX is the maximum value from one member of the dimension members in the dimension, MIN is the minimum value from one member of the dimension members in the dimension, and AVG is the average value of all members in the dimension.

For each of the dimensions there will be a number of possible values across all of the records and each record has a value for the target measure column. As an example, refer to table 200 in FIG. 2 and use the dimension "location" while specifying the "total sales" as the target measure column. For the location dimension there may be three possible values, including UK (United Kingdom), USA (United States of America), and IRL (Ireland). The dataset under consideration includes many records, where each record has a value for the "location" dimension and "total sales" measure. Note that multiple records can have the same "location" value.

Continuing this example, considering only the "location" dimension and at the same time the "total sales" target measure, the sales amount belonging to a same country can be aggregated to get a sum. The sum amount belonging to each country (e.g., the sum of "total sales" amount for USA, the sum of "total sales" amount for IRL, and the sum of "total sales" amount for UK) can be determined. That is, the sum of the target measure value (e.g., "total sales" amount) belonging to all of the possible values (e.g., USA, IRL, UK) is determined for the same dimension (e.g., "location"). Accordingly, for a given dimension (e.g., "location") the sum of the target measure value ("total sales") is determined for all of the possible values for that dimension (e.g., UK, IRL, UK). There are a number of possible values for each dimension. In the present example, for the "location" dimension column being analyzed, there are three (3) possible values (i.e., IRL, UK, and USA). Based on the aggregation, the sum of the "total sales" (i.e., the target measure value aggregation) for each of the three locations is obtained. Next, the average value across all of the countries in terms of the "total sales" amount is determined. For example, if the "total sales" amount for USA=1000, IRL=300, and UK=500, then these three "total sales" values for the three possible "location" dimension values results in an average of 600, where the max value=1000 and the min value is 300. Thus, for this example, a deviance score=(max value−avg value)/avg value=(1000−600)/600=400/600=2/3=0.666. This is the deviance score for the "location" dimension, but there are multiple other dimensions (e.g., "product type" dimension, etc.). A deviance score can be calculated for each dimension, where the dimensions having the highest deviance score may be referred to as the top contributors. In some instances, the single top contributor might be determined and presented (i.e., the one dimension having the highest deviance score), the top five(5) contributors might be determined and presented (i.e., the five(5) dimensions having the highest relative deviance score), the top twenty (20) contributors might be determined and presented (i.e., the twenty(20) dimensions having the highest relative deviance score), etc.

Figure 3:
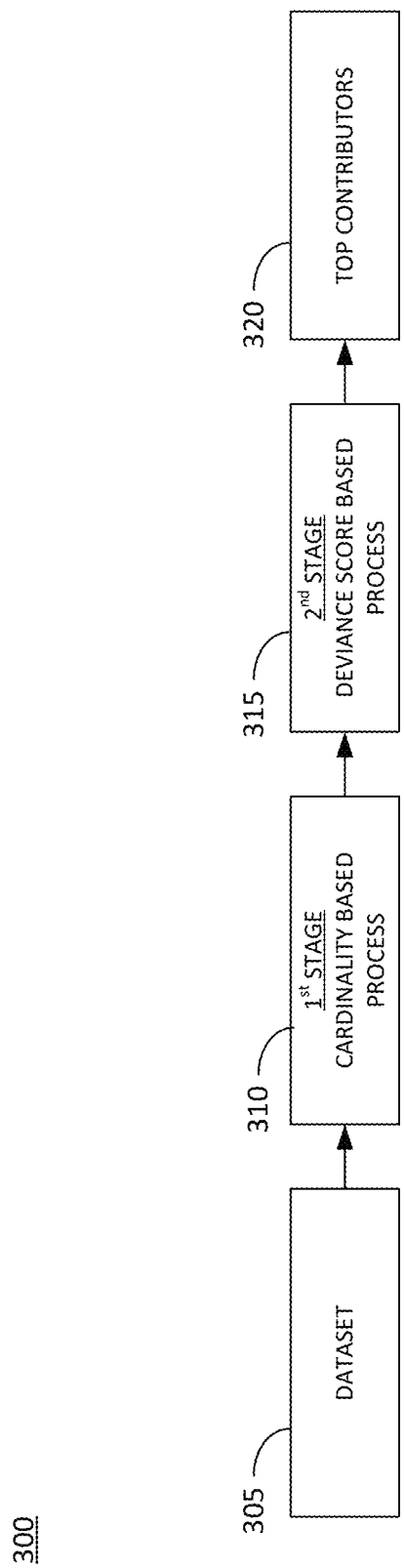
FIG. 3 is an illustrative block diagram illustrating an overview of some aspects of a known top contributor process.

FIG. 3 is an illustrative block diagram illustrating an overview of some aspects of a known top contributor process. The process 300 depicted in FIG. 3 is a two-stage process for determining top contributors for a dataset. A dataset 305 is processed through a two-stage process or pipeline. The first stage 310 uses a cardinality based process to determine, from the entirety of a dataset, a first set (e.g., 20) of candidate top contributors. In process 310, the cardinality refers the number of unique members in a dimension. The output of the first stage is provided as an input to the second stage 315. Second stage 315 uses a deviance score (e.g., similar or the same as the deviance score discussed above) to determine a set of the top contributors 320 (e.g., 5) based on the candidate top contributors provided by the first stage.

In some aspects, the 2-stage process of FIG. 3 might be limited since the first stage and second stage derive their respective results based on different criteria. As such, there may be inconsistencies between the determined candidate top contributors and the determined top contributors. Additionally, it may be very time consuming to calculate the candidate top contributors from the full dataset that might contain many columns and a huge number of records. For process 300, the full dataset is analyzed for each specification of a target measure column and dimension variables (i.e., each time a customer desires a different evaluation). The first stage processing can be resource intensive and may generally be performed by the backend in a cloud environment. Even if the second stage processing is performed by the frontend of the system, there may still be potential performance issues with the backend processing for each new analysis.

Figure 4:
FIG. 4 is a block diagram illustrating an overview of a top contributor process, according to some embodiments.

FIG. 4 is a block diagram illustrating an overview of a top contributor process, according to some embodiments. Process 400 includes determining the metadata of the original dataset that includes a probability distribution for a specified target measure column and the rankings for the dimensions of a dataset being analyzed at operation 405. The output of the probability distribution for a specified target measure column and the rankings for the dimensions of the dataset determined at operation 405 are provided to operation 410 as an input. Operation 410 includes determining, for a subset of the dataset, a probability distribution for the target measure of the subset of the data and the dimension scores of the subset of the data that is approximately derived from the probability distribution for the specified target measure column and the rankings for the dimensions of the (original) dataset. The subset of data corresponds to data of the dataset related to a specified target measure column and one or more specified dimensions (i.e., variable values) and the approximated dimension scores for the subset of data is used to determine the top contributors based on the specified variable values.

In some aspects, a top contributor process represented by process 400 may provide and support a number of technical improvements. For example, the process may be executed very fast and may be considered lightweight because the original dataset is not used in deriving the top contributors since the top contributors are derived from the metadata of the dataset, including the probability distribution of the target measure column and the rankings for the dimensions of the dataset (not the dataset itself). Due, at least in part, to the process 400 deriving the top contributors from the metadata of the dataset, this lightweight processing might be performed by a frontend system in a cloud environment. Additionally, the potential issue of inconsistency noted above regarding the two-stage process of FIG. 3 can be avoided in a process represented by process 400.

Figure 5:
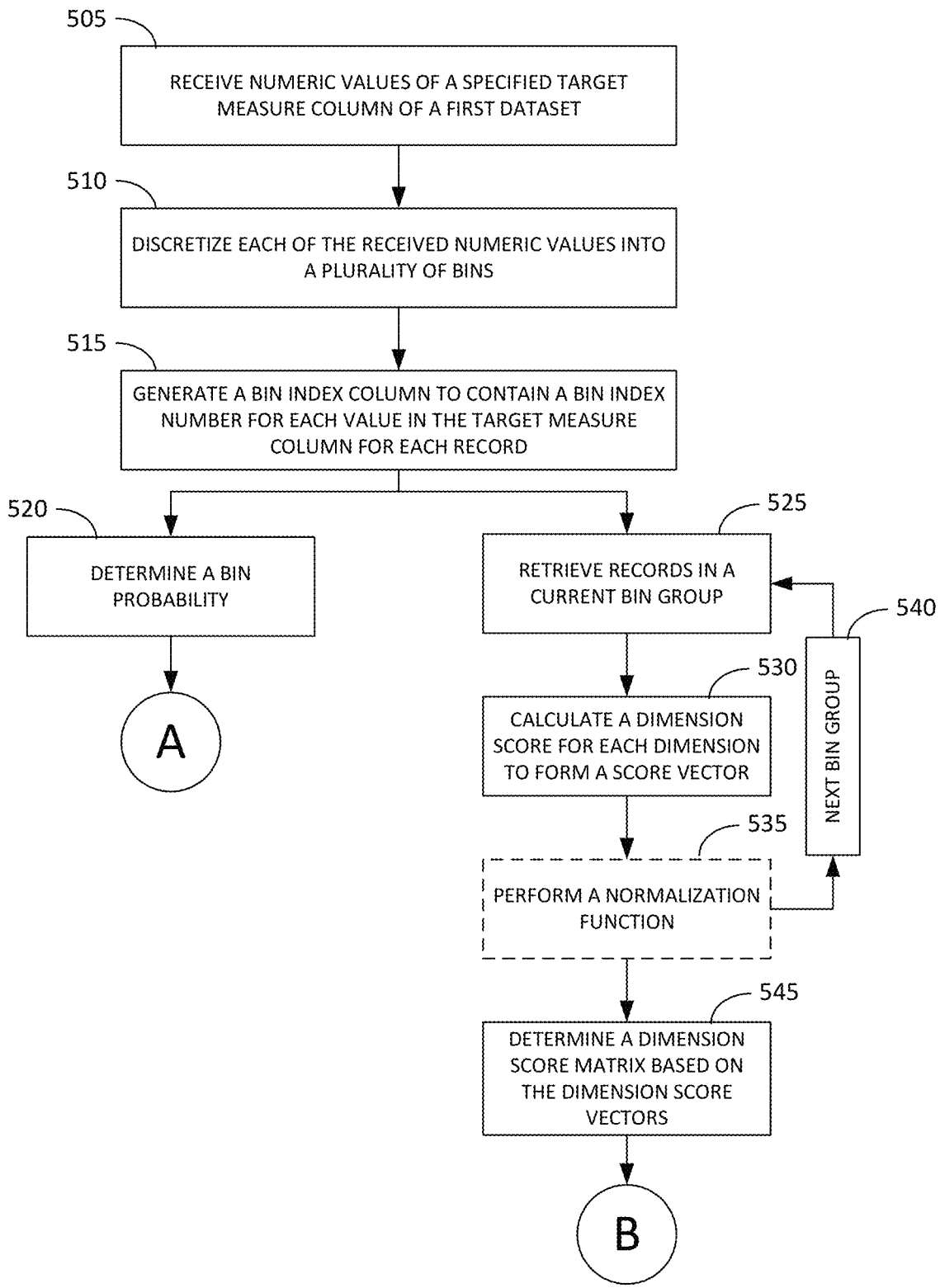
FIG. 5 is a flow diagram illustrating some aspects of a top contributor process, including extracting metadata of a dataset, according to some embodiments.

FIG. 5 is a flow diagram illustrating some aspects of a top contributor process 500, including extracting metadata of a dataset, according to some embodiments. At operation 505, all of the values of a specified target measure column of a dataset are retrieved for the dataset. The retrieved values include all of the values for the specified target measure column across all records of the dataset.

At operation 510, a plurality of bins are created and the retrieved values are discretized into a plurality of bins, where the bins are equally distributed. The number of bins, M, created may be pre-defined (e.g., M=10). Creating the bins might include creating a range for each of the bins and allocating all of the records to the bins based on the specified target measure values. The interval width of the bins may be determined by $$\Delta x = \frac{(x_{max} - x_{min})}{(M-1)}$$

where $x_{max}$ is the maximum target measure value and $x_{min}$ is the minimum target measure value. Each value in the target measure column is discretized into the index of the bin to which it is assigned based on the following formula $$b_i = \frac{(x_i - x_{min})}{\Delta x}.$$

As an example, for 10 bins (i.e., M=10) where the values in the target measure column include a minimum value=1 and a maximum value=100, then a first bin (e.g., bin1) includes records corresponding to values 1-10, a second bin (e.g., bin2) includes records corresponding to values=11-20, a third bin (e.g., bin3) includes records corresponding to values=21-30, a fourth bin (e.g., bin4) includes records corresponding to values=31-40, etc. to the tenth bin (e.g., bin10) including records corresponding to values 91-100. Note, although there are 10 bins, each having the same range, this does not mean that each bin will have the same number of records assigned thereto. The number of records of the dataset that are assigned to each bin depends on the distribution of the target measure values. For example, some bins might have a lot of records because more records have the values within the range of a particular bin than other bins. For example, a dataset might have 200 records with target measure values corresponding to bin2 (interval=11-20) compared to bin3 (interval=21-30) for which only 50 records have target values in the range of 21-30. In some instances, one or more bins might be empty. Accordingly, the distribution in terms of the number of records assigned to the different bins will vary depending on the target measure values across all records for the dataset.

At operation 515, a bin index column (or other data structure) might be generated that contains the determined bin index for each target measure value of each record in the dataset. In the current example, the bin indexes might be indicated by the numbers 1-10, although other designations or identifiers might be used. The bin index column might be used to accomplish two tasks starting at operations 520 and 530.

At operation 520, a probability of a value being assigned to the bins is calculated. That is, the probability of a target value in the i-th bin is calculated. The bin probability may be calculated based on the formula $$p(BIN_i) = \frac{N_{BIN_i}}{N}$$

which indicates how likely one record in the original dataset has a target measure value belonging to the i-th bin. The $N_{BIN_i}$ is the number of records in the i-th bin and the N is the number of records of the original dataset. An output of operation 520 is the determined probability of each bin represented by $p(BIN_i)$, i=1, . . . M. This output is saved at "A".

In some aspects, by assigning the records into the bins, process 500 obtains a subset of the data belonging to the same bin. Since it is a subset of the original dataset, a dimension score for each dimension can be calculated based on the subset of the data belonging to the same bin. For example, if there are 10 bins, then there will be 10 sets of the dimension score, where the dimension score will be from the same dimension across the 10 bins.

Starting at operation 525, a determination may be executed, based on the generated bin index column, to determine a dimension score for each dimension column in each subset of the original dataset belonging to the same bin to form a dimension score vector for each bin. This determination may be executed in parallel to branch A including operation 520.

At operation 525, the records in the original data may be organized into bin groups where all of the records with the same bin index are grouped together in a same bin group. For example, all of the records with bin index 1 are grouped into bin group 1, all records with bin index 2 are grouped into bin group 2, etc., where there are M bins (M=10 in the current example). Records in a current bin group are retrieved at 525.

At operation 530, a "dimension score" is calculated for each dimension, based on the grouped records for each bin, to generate a score vector. In some instances, the "dimension score" can be the same as or similar to the "deviance score" mentioned above. In some other instances, the "dimension score" might be based on some other calculation. This other or alternative calculation might be tailored to fit a particular analysis function or objective. Accordingly, herein we refer to the calculation at 530 as a "dimension score" since the calculation performed here is not necessarily the same as or even limited to being similar to the previously introduced "deviance score". The "dimension score" herein might be calculated on another basis or formulation depending on a user's interest or objectives. In one regard, based on the records in each bin group, the "dimension score" is calculated for each dimension to form the score vector for a particular bin.

At operation 535, the output of operation 530 might be optionally subjected to a normalization function or process (e.g., the softmax function) to potentially facilitate further processing of the outputs of operation 530. The operations 525-535 are repeated, as indicated at 540, until a "dimension score" is calculated for each dimension to form the score vector for all of the bin groups for the dataset. Each bin will have a "score vector" and the elements in the score vector correspond to each of the dimensions.

At operation 545, all of the score vectors across all of the bins are combined to obtain or otherwise generate a M×K "dimension score matrix", where there are M rows corresponding to the M bins and K columns corresponding to the K dimensions of the dataset. For example, in the current example there are 10 bins and assuming there are 20 dimensions, the dimension score matrix will include 10 rows (i.e., M rows) and 20 columns (i.e., K columns). The dimension score matrix is saved at "B". Note that each row in the dimension score matrix is the dimension score vector, $m_i$, indicative of the dimension scores of dimensions in one bin.

The outputs "A" and "B" are determined based on the original dataset and comprise metadata of the original dataset, where "A" represents the bin probability and "B" represents the dimension score matrix. This metadata might be extracted each time a new dataset is uploaded to the cloud. As will be discussed in greater detail below, top contributors may be derived based on the extracted metadata, instead of the original dataset. In some embodiments, the original dataset may be discarded (at lease for top contributor purposes) after the extraction of the metadata based thereon, wherein the metadata can be saved to the cloud. As seen, the extracted metadata does not include sensitive information that might be included in the original dataset (e.g., minimum values, maximum values, averages of values, number of values, etc.). The extracted metadata includes the score of each dimension across the different bins, along with the bin probability. In some embodiments, the metadata regarding the original dataset alone may be used to determine the top contributors, as will be explained in further reference to FIG. 6.

In some embodiments, a user may be permitted to dynamically set variable values (e.g., via a UI accepting textual inputs or other UI inputs) or navigate a hierarchical structure representation of a data model to select or specify a selection of values therein. Based on variables setting, a process of detecting top contributors in some embodiments herein may be initiated based on the data relating to the specified variable values. For example, an original dataset might include sales transactions from different countries. When a user sends a request to set the "Country Location" variable value to "UK", then the top contributors should be derived based on the sales transactions from the UK. In some aspects, some embodiments of a top contributor determination process and system herein permit or otherwise accommodate changing the variable settings or navigating in hierarchical structure without also requiring that a new analysis be performed based on either the full original dataset or a subset of original dataset as defined by the new variable settings.

Figure 6:
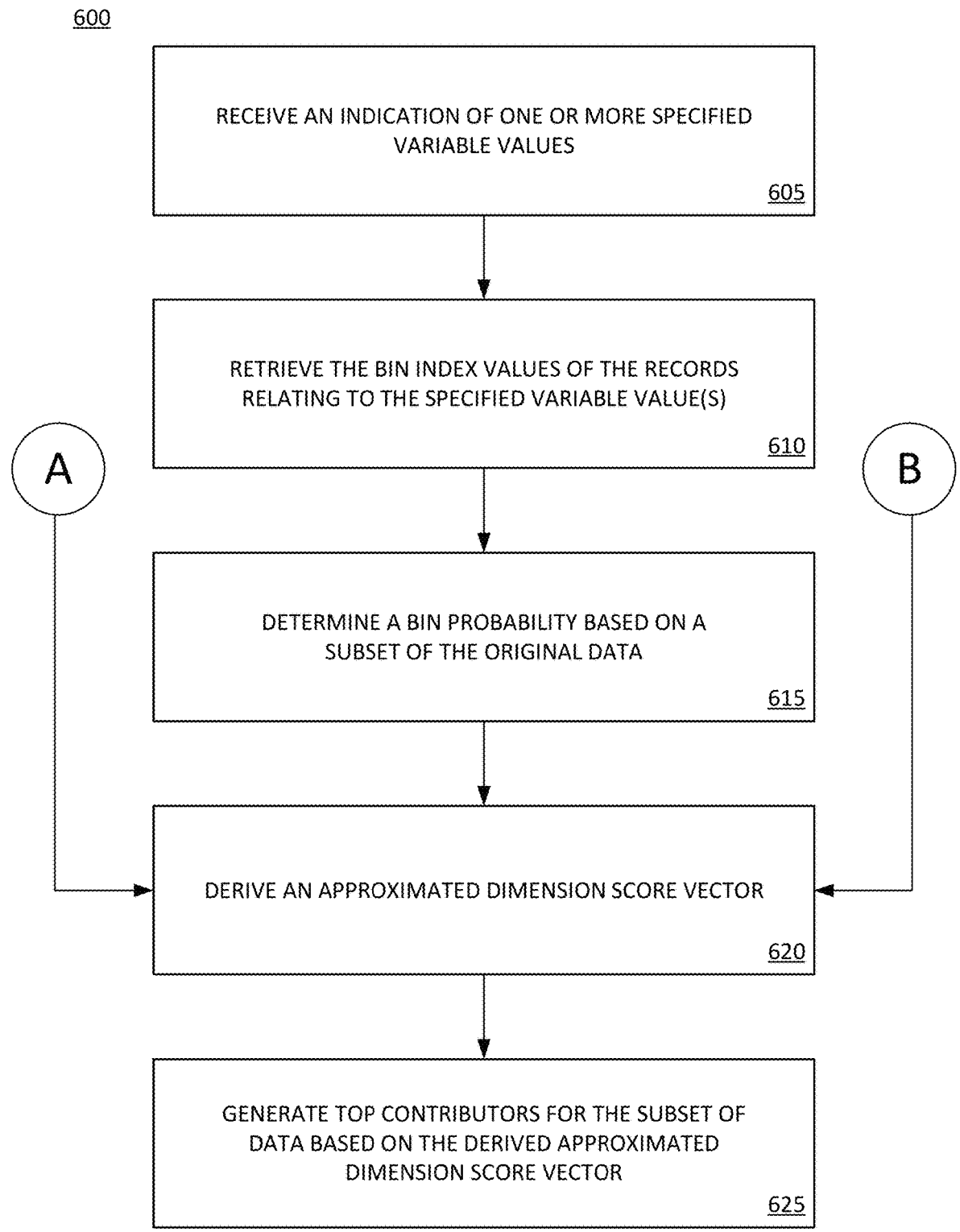
FIG. 6 is a flow diagram illustrating some aspects of a top contributor process, including a determination of top contributors based on the extracted metadata of a dataset, according to some embodiments.

FIG. 6 is a flow diagram illustrating some aspects of a top contributor process 600, including a determination of top contributors based on extracted metadata of a dataset, according to some embodiments. In some aspects, FIG. 6 illustrates a process in which the extracted metadata for a dataset, as discussed with respect to FIG. 5, may be used to determine the top contributor(s). In some embodiments, a user logging into a data analytics service or application provided in a cloud environment may have extracted metadata associated with a dataset loaded into a browser running on their frontend client device. The end user might navigate, via the browser, to specific data to make one or more specific selections. For example, the user might make a selection, as indicated at operation 605, to indicate that they are interested in a specific set of data (e.g., an analysis related to USA data or UK data). Note that when the user changes the variable settings (e.g., changes a value for the "location" dimension from USA to UK), the system may operate to retrieve the values in the bin index column (or other data structure) of the records relating to the new value (e.g., UK), as stated at operation 610. In some regards, the system will not retrieve a subset of the original data as defined by the variable settings. For example, the bin index values belonging or relating to the specified variable setting of the UK "location" are retrieved, as opposed to any sensitive or other data of the original dataset.

At operation 615, based on the retrieved bin index values, a bin probability is calculated or otherwise determined for each bin belonging to the UK. This bin probability may be determined based on the formula $$q(BIN_i) = \frac{N'_{BIN_i}}{N'}$$

where $N_{BIN_i}'$ is the number of records having the i-th bin index based on the retrieved bin index values and N' is the number of retrieved bin index values based on the variable setting. An output of operation 615 includes the probability of each bin as calculated, q($BIN_i$), i=1 ... M, based on the variable setting.

Note that the retrieved bin index values relate to a subset of the original dataset. In some instances it is possible that there is zero probability for one or more of the bins, where a zero probability indicates the related subset of data does not have measure target values from the corresponding bin interval.

Initially, based on the bin index, we calculated the probability of each bin across the whole dataset (i.e., across all records as shown in the process 500 of FIG. 5), but in process 600 the probability of each bin across a subset of the bin index values is calculated at operation 615. The probability for each bin and the dimension score vector for each bin, which are based on the original dataset, are represented by "A" and "B", respectively, as determined in FIG. 5. When the user selects a subset of the whole dataset, it is a form of sampling wherein the user is sampling a portion of the whole dataset based on some specified conditions. For example, when the user specifies a "location" limited to the UK, the process 600 essentially obtains some samples relating to the UK data.

Based on the calculated q($BIN_i$) and p($BIN_i$), each row of the dimension score matrix, that is the dimension score vector for the i-th bin, $m_i$, is weighted using the formula $$\left(\frac{q(BIN_i)}{p(BIN_i)}\right)m_i.$$

At operation 620, the weighted dimension score vectors from all bins are summed together, where an approximated dimension score vector is derived for the subset of data as indicated in the following formula $$\text{Approximated Dimension Score Vector} = \sum_{i=1}^{M} \frac{q(BIN_i)}{p(BIN_i)} m, \ p(BIN_i) > 0$$

where p($BIN_i$) is the bin probability for the whole dataset (i.e., "A"), and q($BIN_i$) is the bin probability for the subset of data. The M is the number of bins, and $m_i$ is the dimension score vector for the i-th bin, based on the whole dataset (i.e., "B").

In some embodiments, the approximated dimension score vector contains K elements, corresponding to the K dimensions. The higher the value in the approximated dimension score vector is an indication that the values of the corresponding dimension in the subset of data have more interested information as defined by the dimension score and thus might be of more interested to the user. Note, when the deviance score is used to derive the value for $m_i$, the dimension with a higher value is more likely to have higher deviance score. In some embodiments, the output of operation 620 is the approximated dimension score vector and it is used at operation 625 as a basis for providing a recommendation and/or a presentation of the top contributors, where the dimensions with highest relative values in the vector may be returned as recommended top contributors.

In some aspects and embodiments, the process(es) herein to determine top contributors based on an approximated dimension score vector derived from metadata extracted from a full dataset might be implemented at least partially, as a frontend process. For example, a backend of a cloud platform might initially access the dataset and extract the metadata therefrom, as disclosed herein when a new dataset is uploaded to the cloud. The extracted metadata may be cached or otherwise persisted so that it might be subsequently used to derive top contributors in reply to user requests. The extracted metadata may, in some embodiments, be preloaded to the frontend when a story based on the data is loaded. In this manner, a process of determining a top contributor recommendation may be performed at the frontend by using the metadata. Accordingly, no database connection or computation at backend may be required when recommending the top contributors in accordance with some aspects herein.

In some instances, implementations of certain aspects of the top contributor framework disclosed herein have been validated and confirmed. For example, processes disclosed herein (e.g., process 600) were performed to identify the top five(5) contributors with the highest deviance scores with a specified measure. Two different ways of evaluating the performance were considered based on the extracted metadata. One method included performing the process of FIG. 6 to identify the top contributors based on the entire data. Another method was performed to simulate a user specifying variable settings by iterating all the possible values in all dimensions, where the scenario of a user narrowing down the data by selecting a single member in one dimension was simulated. Testing revealed that the accuracy based on the entire data for multiple different datasets was greater than 80% of the actual top 5 contributors of the entire testing datasets. The accuracy with the simulated variable setting likewise indicated that process 600 provides accurate results, with greater accuracy and stability when the number of top contributors is increased.

Figure 7:
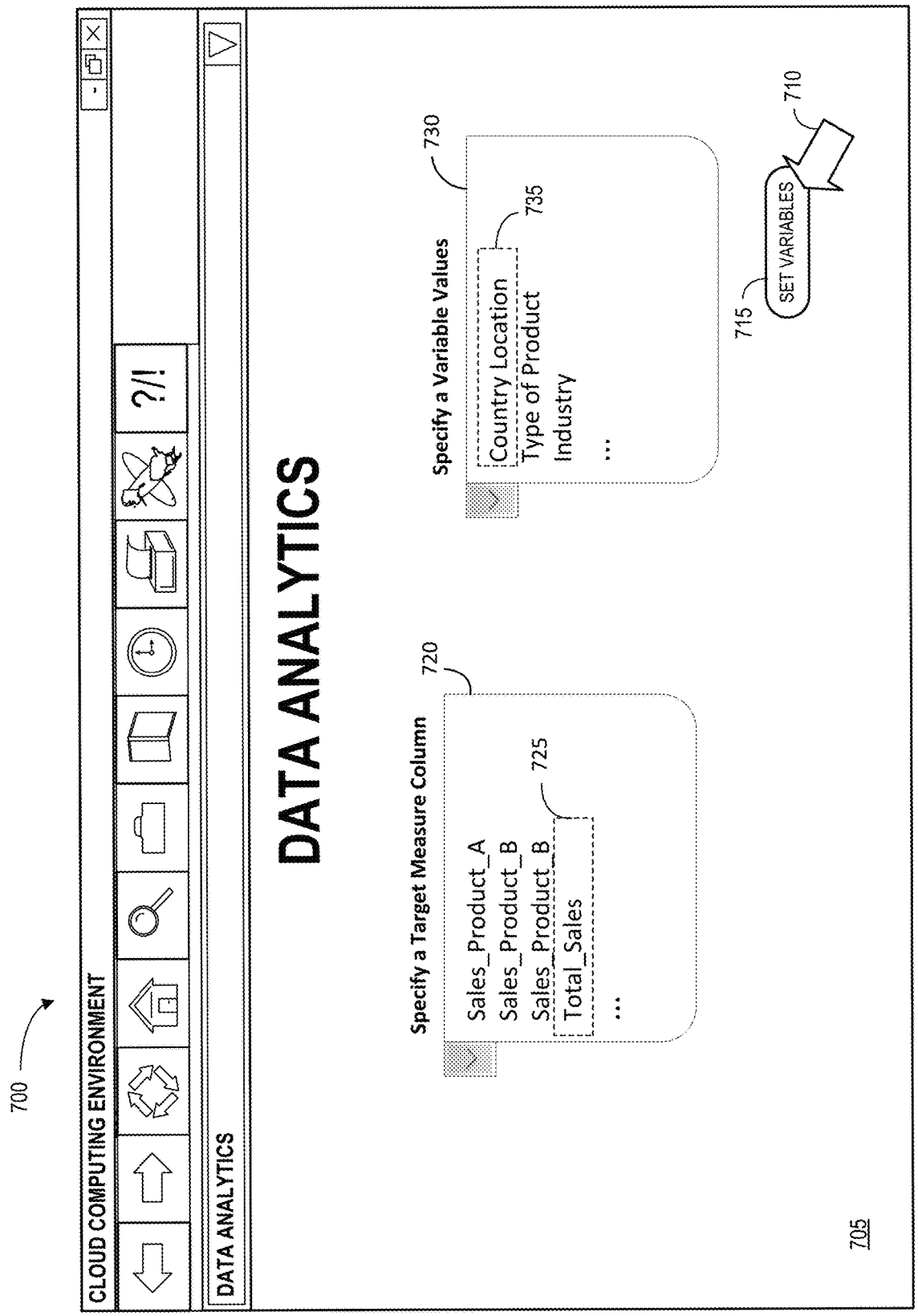
FIG. 7 is an illustrative depiction of an outward facing graphical user interface, including mechanisms to specify variables and target measures, according to some embodiments.

FIG. 7 is an illustrative depiction of an outward facing graphical user interface, including mechanisms to specify variable values and target measures, according to some embodiments. Display 700 includes a graphical representation of an outward facing user interface (UI) 705 related to a data analytics service associated with a cloud computing environment. UI 705 may be displayed within a display device associated with a data analytics service or a display device independent of the data analytics service (e.g., a display of a computing device or system in communication with the data anonymization over a network via a browser application). Selection of one or more UI elements (e.g., icons, buttons, drop-down menu options, etc.) by a touch-screen input, computer pointer 710, etc. may result in the display of a popup window containing more detailed information about that element and/or various options (e.g., to specify a target measure column, specify or select variable values, etc.). Selection of an "Edit Variables" icon 715 may enable a customer user or administrator to indicate or change a specified target measure column within drop-down menu 720 (e.g., the selection of "Total_Sales" 725) and select specific dimensions to constrain the scope of an analysis of a dataset by selecting one or more dimension within drop-down menu 730 (e.g., the selection of "Country Location" 735). A selection of the one or more dimensions at 730 may further cause the possible variable values corresponding to the selected dimension to be presented to the user. The user may then specify which of the possible values (e.g., for the selected "Country Location", the user may select one or more of the possible values of UK, USA, and IRL) to be used in an analysis of the data in order to generate the top contributors.

Figure 8:
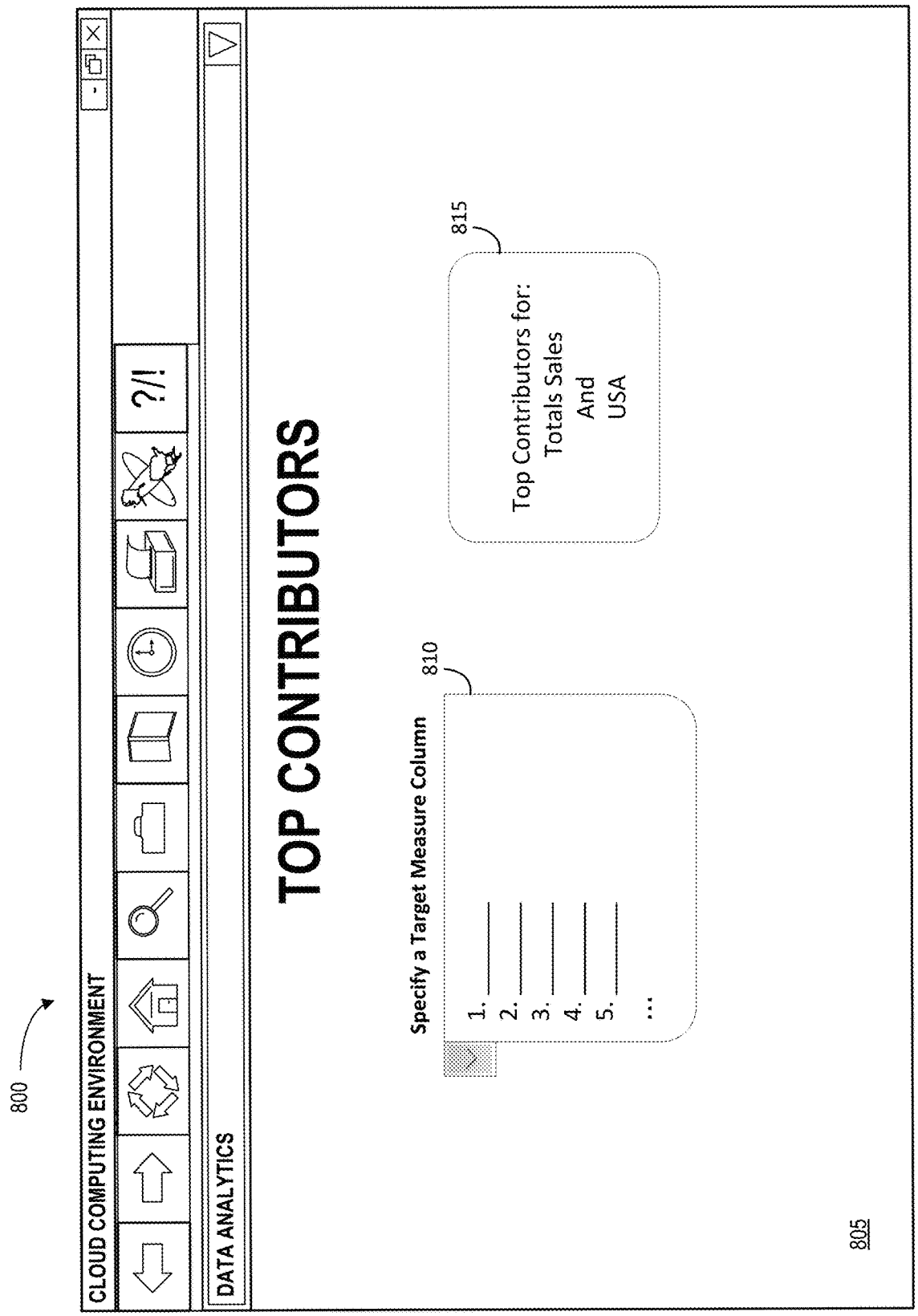
FIG. 8 is an illustrative depiction of an outward facing graphical user interface, including the presentation of top contributors, according to some embodiments.

FIG. 8 is an illustrative diagram of a data analytics display 800 according to some embodiments. Display 800 includes a graphical representation of an outward facing user interface (UI) 805 related to a cloud computing data analytics service. UI 805 may be displayed after a user specifies the variable values and target measure column, such as in the example of FIG. 7. UI 805 includes a presentation of the top contributors generated in accordance with some embodiments herein at 810. The top 5 (or other number of top contributors) can be presented within drop-down menu 810, wherein the user may be able to scroll down the listing of the top contributors to further view the top 10 or top 20 contributors (if so calculated). In the example of FIG. 8, the values specified by the user (or other entity) and used in the determination of the top contributors is also presented in at 815 to provide, in some instances, context for the presented top contributors.

In some embodiments, a hierarchical data model representation of a dataset being analyzed can be presented to the user, wherein the user navigates the hierarchical structure and selects or otherwise identifies the dimensions, target measures, and variable values they want to use in an analysis of the dataset. Thus, various different mechanisms may be used to solicit and register a user's input in the top contributor processes disclosed herein and FIGS. 7 and 8 are example implementations.

Figure 9:
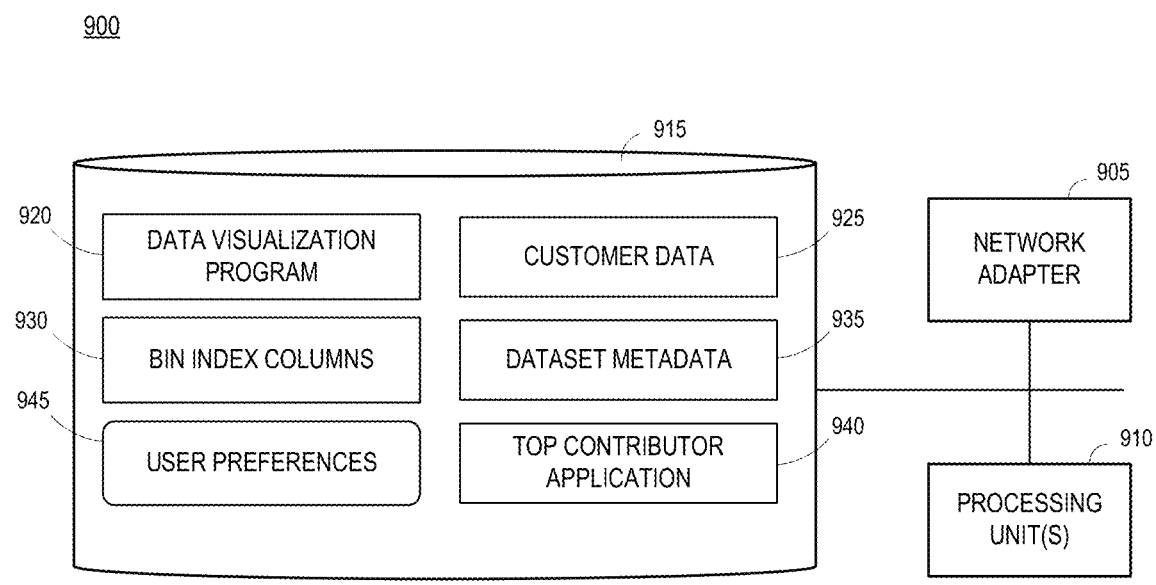
FIG. 9 is a block diagram of a system to determine top contributors, according to some embodiments.

FIG. 9 is an illustrative block diagram of a computing system 900, according to some embodiments. System 900 may comprise a computing system to facilitate data analytics in a cloud environment, including processes to provide greater insight into a set of analyzed data, including but not limited to, underlying patterns in the data. In some embodiments, computing system 900 may include a standalone system, and one or more elements of computing system 900 may be located in the cloud.

System 900 includes network adapter 905 to communicate with external devices via a network connection. Processing unit(s) 910 may comprise one or more processors, processor cores, or other processing units to execute processor-executable program code. Storage system 915 may include one or more memory devices (e.g., a hard disk drive, a solid-state drive) and stores processor-executable program code of data anonymization program 920 that may be executed to anonymize data, in accordance with one or more processes herein.

Data visualization program 920 may access and initially retrieve customer data 925 from a customer location in response to a user request to analyze their data and generates visualizations (e.g., charts of one or more configurations) related thereto. As discussed in detail above (e.g., process 600 of FIG. 6), top contributor application 940 may operate to generate dataset metadata for the customer data being analyzed, where bin index columns 930 are generated in accordance with some embodiments herein. After the metadata 935 is extracted from the dataset and saved as disclosed in detail above, the customer data might be discarded since the top contributor application derives the top contributors based on the metadata, not the original dataset or parts thereof. In some embodiments, user preferences 945 may be referenced in determining the top contributors so that, for example, the results are configured to the customer's liking. For example, the customer may prefer to have a specific number of top contributors generated and presented to them (e.g., top 10 contributors).

Computer programs herein (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method, the method comprising:
   receiving all numeric values of a specified target measure column of a first dataset including a plurality of records, the first dataset having a plurality of columns including the specified target measure column and a plurality of non-numeric, dimension columns for the records of the first dataset;
   discretizing each of the received numeric values of the target specified measure column into a plurality of bins, the plurality of bins being a pre-defined value, each of the bins having an equal interval width, and each of the bins having an index number;
   generating a bin index column that contains a determined bin index number for each numeric value of the specified target measure column of each record in the first dataset;
   determining a bin probability that represents a probability of each of the numeric values of the specified target measure column of the first dataset being in each of the bins based on the generated bin index column;
   determining, based on the generated bin index column, a dimension score for each dimension column of the first dataset in each bin;
   forming, based on the determined dimension score, a dimension score matrix for the first dataset; and
   saving the determined bin probability and the dimension score matrix as metadata for the first dataset.

2. The method of claim 1, further comprising:
   receiving an indication of one or more specified variable values, the specified variable values each being a value selected from one or more of the plurality of non-numeric, dimension columns of the first dataset;
   retrieving values in the bin index column of the records related to the specified one or more variable values;
   determining a second bin probability, based on the retrieved bin index column values of the records related to the specified one or more variable values, that represents a probability of a value in the retrieved bin index column of the records related to the specified one or more variable values being in each of the bins;

deriving, by a first calculation, an approximated dimension score vector of a subset of the first dataset related to the specified one or more variable values based on the determined bin probability of a value being in each of the bins for the first dataset, the determined dimension score matrix for the first dataset, and the determined second bin probability; and saving an output of the approximated dimension score vector.

3. The method of claim 2, wherein a weighted dimension score vector is used in deriving the approximated dimension score vector.

4. The method of claim 2, further comprising:
determining a first set of dimensions in the approximated dimension score vector having a highest value relative to each other, the number of dimension in the set being predefined; and
presenting the determined set of dimensions to a user.

5. The method of claim 4, further comprising:
determining a second set of dimensions in the approximated dimension score vector having a highest value, the number of dimension in the second set being predefined and fewer than the number of dimensions in the first set; and
presenting the determined second set of dimensions to a user.

6. The method of claim 2, wherein the first calculation to derive the approximated dimension score vector is substituted with a second calculation based on at least the determined bin probability for the first dataset and the determined dimension score vector for the first dataset.

7. A non-transitory, computer readable medium having executable instructions stored therein that, when executed by a computer processor cause the processor to perform a method, the method comprising:
receiving all numeric values of a specified target measure column of a first dataset including a plurality of records, the first dataset having a plurality of columns including the target measure column and a plurality of non-numeric, dimension columns for the records of the first dataset;
discretizing each of the received numeric values of the target specified measure column into a plurality of bins, the plurality of bins being a pre-defined value, each of the bins having an equal interval width, and each of the bins having an index number;
generating a bin index column that contains a determined bin index number for each numeric value of the specified target measure column of each record in the first dataset;
determining a bin probability that represents a probability of each of the numeric values of the specified target measure column of the first dataset in each of the bins based on the generated bin index column;
determining, based on the generated bin index column, a dimension score for each dimension column of the first dataset in each bin;
forming, based on the determined dimension score, a dimension score matrix for the first dataset; and
saving the determined bin probability and the dimension score matrix as metadata for the first dataset.

8. The medium of claim 7, further comprising:
receiving an indication of one or more specified variable values, the specified variable values each being a value selected from one or more of the plurality of non-numeric, dimension columns of the first dataset;
retrieving values in the bin index column of the records related to the specified one or more variable values;
determining a second bin probability, based on the retrieved bin index column values of the records related to the specified one or more variable values, that represents a probability of a value in the retrieved bin index column of the records related to the specified one or more variable values being in each of the bins;
deriving, by a first calculation, an approximated dimension score vector of the first dataset related to the specified one or more variable values based on the determined bin probability of a value being in each of the bins for the first dataset, the determined dimension score matrix for the first dataset, and the determined second bin probability; and
saving an output of the approximated dimension score vector.

9. The medium of claim 8, wherein a weighted dimension score vector is used in deriving the approximated dimension score vector.

10. The medium of claim 8, further comprising:
determining a first set of dimensions in the approximated dimension score vector having a highest relative value, the number of dimension in the first set being predefined; and
presenting the determined first set of dimensions to a user.

11. The medium of claim 10, further comprising:
determining a second set of dimensions in the approximated dimension score vector having a highest value, the number of dimension in the second set being predefined and fewer than the number of dimensions in the first set; and
presenting the determined second set of dimensions to a user.

12. The medium of claim 8, wherein the first calculation to derive the approximated dimension score vector is substituted with a second calculation based on at least the determined bin probability for the first dataset and the determined dimension score vector for the first dataset.

13. A system, the system comprising:
a computer processor, and
computer memory, coupled to the computer processor, storing instructions that, when executed by the computer processor cause the computer processor to:
receive all numeric values of a specified target measure column of a first dataset including a plurality of records, the first dataset having a plurality of columns including the target measure column and a plurality of non-numeric, dimension columns for the records of the first dataset;
discretize each of the received numeric values of the specified target measure column into a plurality of bins, the plurality of bins being a pre-defined value, each of the bins having an equal interval width, and each of the bins having an index number;
generate a bin index column that contains a determined bin index number for each numeric value of the specified target measure column of each record in the first dataset;
determine a bin probability that represents a probability of each of the numeric values of the specified target measure column of the first dataset being in each of the bins based on the generated bin index column;
determine, based on the generated bin index column, a dimension score for each dimension column of the first dataset in each bin;

form, based on the determined dimension score, a dimension score matrix for the first dataset; and save the determined bin probability and the dimension score matrix as metadata for the first dataset.

14. The system of claim 13, further comprising:

receiving an indication of one or more specified variable values, the specified variable values each being a value selected from one or more of the plurality of non-numeric, dimension columns of the first dataset;

retrieving values in the bin index column of the records related to the specified one or more variable values;

determining a second bin probability, based on the retrieved bin index column values of the records related to the specified one or more variable values, that represents a probability of a value in the retrieved bin index column of the records related to the specified one or more variable values being in each of the bins;

deriving, by a first calculation, an approximated dimension score vector of the first dataset related to the specified one or more variable values based on the determined bin probability of a value being in each of the bins for the first dataset, the determined dimension score matrix for the first dataset, and the determined second bin probability; and saving an output of the approximated dimension score vector.

15. The system of claim 14, wherein a weighted dimension score vector is used in deriving the approximated dimension score vector.

16. The system of claim 14, further comprising:

determining a first set of dimensions in the approximated dimension score vector having a highest value relative to each other, the number of dimension in the first set being predefined; and presenting the determined first set of dimensions to a user.

17. The system of claim 16, further comprising:

determining a second set of dimensions in the approximated dimension score vector having a highest value, the number of dimension in the second set being predefined and fewer than the number of dimensions in the first set; and presenting the determined second set of dimensions to a user.

18. The system of claim 14, wherein the first calculation to derive the approximated dimension score vector is substituted with a second calculation based on at least the determined bin probability for the first dataset and the determined dimension score vector for the first dataset.

* * * * *